United States Patent [19]

Tittle

[11] Patent Number: 4,886,590
[45] Date of Patent: Dec. 12, 1989

[54] CHEMICAL PROCESS CONTROL SYSTEM

[75] Inventor: Douglas L. Tittle, Willoughby, Ohio

[73] Assignee: Man-Gill Chemical Company, Cleveland, Ohio

[21] Appl. No.: 116,479

[22] Filed: Nov. 2, 1987

[51] Int. Cl.⁴ .................... C25D 21/14; C25D 17/00; G05D 9/00
[52] U.S. Cl. .................................. 204/232; 204/275; 204/405; 204/406; 204/408; 422/105
[58] Field of Search ................. 204/232–239, 204/275, 228, 405, 406, 408; 422/105, 107, 108, 113

[56] References Cited

U.S. PATENT DOCUMENTS

| | | | |
|---|---|---|---|
| 3,649,509 | 3/1972 | Morawetz et al. | 204/275 X |
| 3,728,526 | 4/1973 | Youngblood | 422/105 X |
| 3,986,029 | 10/1976 | Koske et al. | 250/336 |
| 4,001,807 | 1/1977 | Dallimonti | 340/324 |
| 4,094,949 | 6/1978 | Ball et al. | 422/108 X |
| 4,169,125 | 9/1979 | Rodriguez et al. | 422/105 X |
| 4,238,853 | 12/1980 | Ehrsam et al. | 375/2 |
| 4,296,409 | 10/1981 | Whitaker et al. | 340/684 |
| 4,300,909 | 11/1981 | Krumhansl | 422/105 X |
| 4,301,505 | 11/1981 | Catiller et al. | 364/200 |
| 4,326,940 | 4/1982 | Eckles et al. | 204/232 |
| 4,357,300 | 11/1982 | Nicklaus et al. | 422/62 |
| 4,546,442 | 10/1985 | Tinker | 364/500 |
| 4,586,143 | 4/1986 | Kaneyasu et al. | 364/509 |

OTHER PUBLICATIONS

"Take Charge of Process Variables with RealTime Computerized Process Control", C.L. Industries (1986).

Primary Examiner—Donald R. Valentine
Attorney, Agent, or Firm—Renner, Otto, Boisselle & Sklar

[57] ABSTRACT

A chemical process control system includes a plurality of sensors for sensing various parameters of several baths employed in a chemical process. A microprocessor is employed to interrogate each sensor, to determine bath characteristics from one or more of the parameters, and for comparing the parameters to established limits. The microprocessor initiates corrective responses whenever a characteristic falls outside its specific limits in an attempt to restore the characteristic to a specified operating target value.

A hierarchy of authorization keys limits access to the apparatus depending upon the level of authority of the person seeking access. Different degrees of authority may be delegated for an apparatus operator, a supervisor and servicing personnel. The apparatus includes a local and remote communication capacity for sending messages concerning malfunctions in the apparatus and for receiving instructions from a remote location for correcting malfunctions. The microprocessor controls the sensors through a plurality of "slots" through which drivers for specific sensors are controlled. The microprocessor controls sensor operation through non-sensor-specific signals that employ an address table to provide sensor-specific signals to the sensor drivers through at least some of the available slots.

25 Claims, 2 Drawing Sheets

CHEMICAL PROCESS CONTROL SYSTEM

BACKGROUND

In many manufacturing and production processes, objects are subjected to a number of sequential chemical treatments to produce a desired product. For example, metal substrates may be treated with phosphates in order to improve their corrosion resistance and susceptibility to subsequent coating procedures. A typical phosphating process includes a number of baths into which a substrate is sequentially immersed. That substrate might intially be immersed in a cleaning or pickling solution, then in a phosphate solution and ultimately in a sealant solution. Between those immersions, the substrate may be immersed in rinsing solutions. In electroplating, chemical process control of numerous solutions may also be applied. There, a substrate may be initially immersed in a cleaning or etching solution. After the cleaning, metal layers are deposited electrolytically on the substrate in other solutions. Again, between immersions in different solutions, the substrate may be immersed in rinsing baths to avoid cross-contamination between the various solutions.

In these and other chemical processes employing multiple baths, it is important to control the characteristics of the baths to produce a product of acceptable and repeatable quality. For example, in phosphating baths and in electroplating baths, maintenance of the pH of the "active" baths within a limited range can be essential to good quality results. Other bath characteristics that may be of importance in some process steps include the concentration of various ions, both absolutely and in relation to each other, the electrical conductivity of the bath and the bath temperature. In rinsing baths, the concentration of ions built up over time from other baths is a significant characteristic. When contamination in a rinsing bath due to "active" baths exceeds acceptable levels, the rinsing solution may need to be changed or cleaned.

In "active" solutions used in electrodepositing, phosphating and cleaning, variations outside established ranges of pH, electrical conductivity and temperature may need corrective action. In the first two instances, the correction may be achieved by adding additional reagents to the solution. In the final case, an adjustment in the current flowing through an electrical heater or in the quantity of coolant flowing through a heat exchanger may correct a temperature variation.

In known chemical process control apparatus, samples can be periodically withdrawn from the baths and analyzed using automated chromatographic and electrochemical techniques. This analytical equipment may be controlled by a microprocessor that, in response to the results produced by the analytical instrument, can activate pumps and/or valves to add make-up chemicals to the baths.

Typically, microprocessor-based chemical process control equipment and the analytical instruments it employs are extremely complex. Therefore, a highly trained operator is required to monitor and control the equipment. In addition, known chemical process controllers are specific to particular analytical instruments. That is, removal of an analytical instrument, such as a chromatograph, and its replacement with a different analytical sensor is difficult. In known microprocessor-based systems, replacement of sensor type requires significant reprogramming.

Accordingly, it would be useful to provide an apparatus and method for chemical process control that can be operated by a relatively unsophisticated person. It would also be desirable to prohibit process control variable and system software alterations by the relatively unskilled operator. The desired system would permit more highly skilled, authorized persons, both off-site and on-site, to supply, as needed, various process control and software change functions. A desirable process control apparatus would permit changes in sensors without significant software changes.

SUMMARY OF THE INVENTION

In the invention, microprocessor-based apparatus is provided for obtaining various bath parameters from each of a plurality of sensors. In general, a number of sensors are associated with each bath and are chosen based upon the important characteristics to be controlled for that bath. Under the control of the microprocessor, the sensed parameters, either alone, or in combination according to mathematical formulas incorporated in the microprocessor, are compared to established, acceptable characteristic limits. When a bath characteristic falls outside its limits, the apparatus acts to bring the bath characteristic back toward an established target operating point. If the corrective action is unsuccessful, the apparatus issues an alarm. The alarm may also signal the operator to take certain actions, to summon more knowledgable assistance or may automatically notify other personnel, such as an on-site supervisor or an off-site supplier or servicer of the apparatus. The other personnel may be automatically notified by telephone.

Preferably, the apparatus includes secured access including a hierarchy of authorization levels to the apparatus and its software. In the lowest authorization level, an unsophisticated operator can operate the apparatus. At the next higher authorization level, operating parameters such as target points of bath characteristics may be altered. In the highest authorization level, alterations can be made to the system software. Preferably, only the supplier or the servicer of the apparatus is provided with the highest authority key and can use that key remotely, for example, over a modem.

The apparatus employs an interface between the microprocessor and the sensors. The interface looks up instructions for controlling, calibrating or measuring with a particular sensor. Regardless of the sensor employed, the same signals for control, calibration, measurement etc. are produced by the microprocessor. The interface, through its look-up table providing addresses for instructions tailored to a particular sensor, allows the addition or substitution of a sensor with its driver merely by inserting or changing an address in the table.

BRIEF DESCRIPTION OF THE DRAWINGS

FIG. 2 is a flow chart illustrating the operation of an embodiment of the invention; and FIG. 3 is a block diagram illustrating the electrical structure of an apparatus according to the invention.

DETAILED DESCRIPTION OF PREFERRED EMBODIMENTS

Figure 1D:
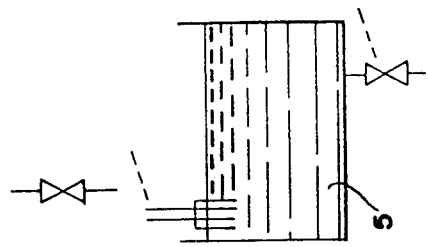
FIGS. 1A-1H are schematic, pictorial views of a chemical process system employing the control apparatus according to the invention.

To aid understanding of the invention, an application is schematically illustrated in FIG. 1. In FIGS. 1A–1H, a hypothetical chemical process for the sequential treatment of a substrate 1 in six liquid baths 2–7 is illustrated. The hypothetical process partakes of many elements of various actual processes. In an actual application, other and different baths may be added to or substituted in the process shown, some of the baths shown may be deleted and different processes, such as electroplating, may be added or substituted.

In the process illustrated in FIGS. 1A–1H, bath 2 is a pickling or cleaning bath in which the surface of a substrate is cleaned and/or treated in preparation for subsequent processing steps. Bath 3 is a rinsing bath intended to remove residual liquid, salts or the like left on substrate 1 after its immersion and cleaning in bath 2. Bath 4 is a temperature controlled substrate treatment bath in which a desired layer is deposited or reactively formed on substrate 1. Rinsing bath 5 is similar to bath 3 where residual chemicals from bath 4 are removed. In bath 6, the substrate having the deposited or reacted surface is subjected to a final treatment, completing, sealing or overcoating the treated substrate. Bath 7 provides a final rinse for removing residual chemicals from the substrate that may have been left from bath 6. In the final step, substrate 1 is illustrated receiving warm air being blown from a nozzle 8 in order to dry the substrate.

Each of baths 2–7 and the final drying step incorporate various sensors for monitoring process conditions. The appropriate sensors for each bath or step depend upon the chemical reactions and other process steps that may occur in the bath. Again, the illustrations of FIGS. 1A–1H are merely exemplary and sensors illustrated may be removed in favor of other, different sensors, some sensors may be deleted entirely and other sensors may be added in supplementation of those illustrated.

Immersed in bath 2 are an electrical conductivity sensor and a temperature sensor 11. In addition, a titrating apparatus 12 includes a tube inserted into the bath to abstract a sample for analysis. Titrating apparatus 12 may be of the type described in my co-pending patent application for "Titrating Apparatus and Method", Ser. No. 101,387 filed Sept. 28, 1987, the disclosure of which is incorporated herein by reference.

Conductivity sensor 10 may be of a conventional, commercially available type in which two electrodes having a known geometry are disposed in a defined arrangement with respect to each other. A potential applied across the two electrodes results in a current flow from which the electrical conductivity of the solution in which the electrodes are immersed can be determined. As an alternative conductivity sensor, the newer alternating current, transformer type sensor may be used. In those sensors, conductivity is determined by measuring the magnitude of a particular waveform signal that is induced in a secondary winding of a transformer in response to excitation of the primary winding. Typically the windings are concentric and toroidal and are encased in an inert material so that contamination by, or deterioration of, electrodes is avoided.

Temperature sensor 11 is a conventional temperature sensor such as a thermocouple, a thermistor, an electrical coil, an integrated circuit, etc. providing an electrical response to changes in temperature. An electrical coil 13 is disposed within bath 2 for conducting a electrical current and heating bath 2.

Although not shown in FIGS. 1A–1H, each of the baths preferably includes a liquid level sensor to ensure that the quantity of liquid in the bath is maintained within a desired range. If the quantity of liquid in bath 2 should drop below the lower end of the range, a valve 14 is opened to admit additional or make-up liquid into the bath. In addition, a drain valve 15 can be opened to drain excess liquid from bath 2. Although emphasis in this description is placed on using liquids, dry make-up materials can also be added to the baths by appropriate apparatus. For example, a worm gear or an endless belt might be used to transport dry make-up reagents to a bath.

In FIGS. 1A–1H, each of sensors 10, 11 and 12, heater 13 and each of valves 14 and 15 includes an oblique, dashed line. These lines indicate connection of these elements to a microprocessor-based computer 20. Computer 20 is provided to interrogate each of the sensors to obtain information and may be used to actuate heating coil 13 and valves 14 and 15.

As a further example, if bath 2 is intended to be acidic for etching a substrate to prepare it for a coating or surface treatment process, the desired acidity range may correspond to a particular range of electrical conductivity for the bath. After the bath is used to treat numerous substrates, its acidity declines. Computer 20 repeatedly interrogates conductivity sensor 10 to monitor conductivity of the solution. When the conductivity drifts outside of established limits, computer 20 causes a correcting response. That response may open valve 14 to admit a make-up solution to increase the acidity of bath 2. At the same time, either the liquid level control or computer 20 may open valve 15 to drain excess liquid from the bath. Likewise, the etching rate of bath 2 may be temperature dependent so that that temperature is monitored by sensor 11. Assuming that the temperature of bath 2 must be elevated above that of its surroundings, computer 20 triggers a current flow through heater 13 when sensor 11 indicates that the temperature of bath 2 has declined below its lower limit.

At the next interrogation, the effects of the corrective action can be determined. If the next sensor interrogation indicates that the characteristic has moved in the desired direction, but is still outside of its established limits, the corrective action is repeated. This iterative process continues during system operation. If a particular corrective action has been attempted a preselected number of times without bringing the characteristic involved within its established limits or if a characteristic does not change in the desired direction after a corrective action, computer 20 issues an alarm. The alarm alerts a system supervisor, manager or servicer that a significant event needing high level attention has occurred.

Titrator 12 can be employed to determine a number of different characteristics of bath 2. Titrator 12 may be used to monitor acidity or may measure another important quantity such as the residual etching capacity, i.e., total acidity left in bath 2 for cleaning substrates. These measurements may be complementary to the electrical conductivity measurement made with sensor 10.

The computer program within computer 20 that evaluates the parameters measured by the sensors may include a formula for combining sensed parameters to provide useful bath condition or characteristic information. For example, a formula may be used to compute bath effectiveness based on the known variation of acidity with temperature and with electrical conductivity. This effectiveness measure can be applied within the software to a table of operating limits. Any variation of the effectiveness measure beyond the limits triggers some responsive change, such as an increase in temperature or acidity. If a response is to be made, then computer 20 sends the appropriate signals, for example, for actuating valves 14 and 15.

An operator of the system viewing a graphical display on computer 20 may be totally unaware of the particular measurements being made, the interrelationships of the parameters being sensed and the table of acceptable limits and operating points that may vary with temperature or other sensed parameters. Instead, the operator, who may be relatively unsophisticated, is presented with information on the computer terminal indicating whether operation within the preselected ranges is proceeding, and whether and what adjustments are being made from time to time to maintain operations within the established limits.

After the immersion of substrate 1 in bath 2, the substrate is extracted and immersed in bath 3 for rinsing. Bath 3 contains an electrical conductivity sensor 21, similar to that of sensor 10. Bath 3 may be a plain water bath having a relatively low electrical conductivity. As residual liquid on substrates is rinsed off within bath 3, the electrical conductivity of bath 3 is likely to increase. When that conductivity strays outside the established limits, indicating contamination of the bath, computer 20 may actuate two valves 22 and 23 for, respectively, adding fresh water to bath 3 and draining away some of the contaminated water.

Figure 1C:
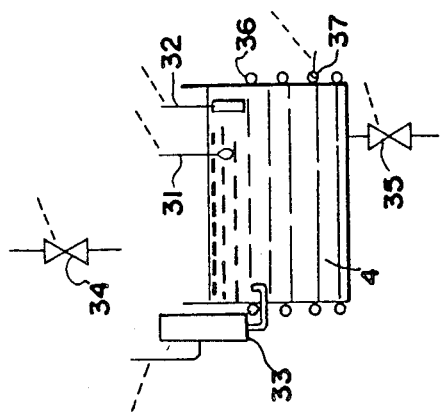
Figure 1B:
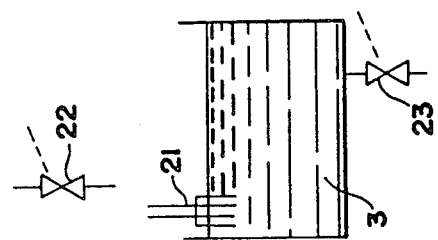
Figure 1A:
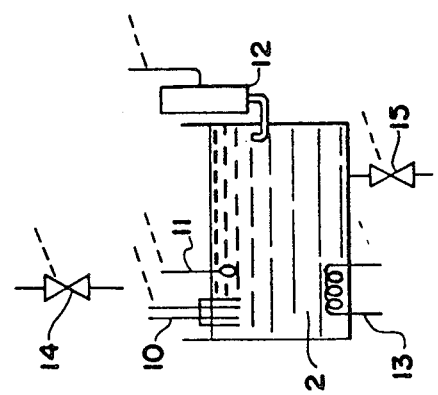
Figure 1H:
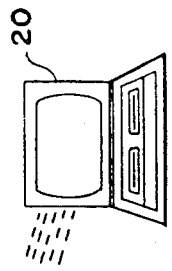
Figure 1G:
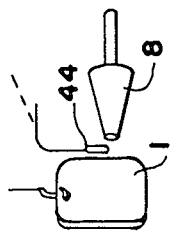
Figure 1F:
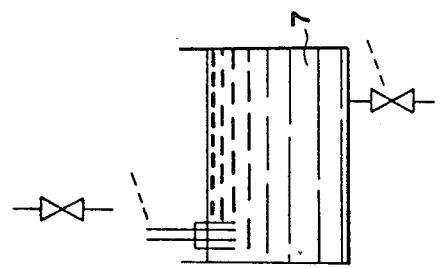
Figure 1E:
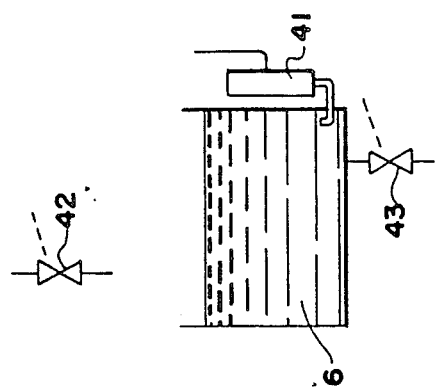

In bath 4, a substrate may be subjected to a coating step in which a coating is deposited on the substrate or a chemical reaction takes place in order to form a coating. A temperature sensor 31, similar to temperature sensor 11, is immersed in bath 4 as is a pH sensor 32. pH sensor 32 may be a conventional, commercially available sensor including a pair of electrodes that are immersed in bath 4. The potential at one of the electrodes is measured relative to that of the other, reference electrode. Sensor 32 is shown in FIG. 1C as only a single unit with the understanding that it includes both an active and a reference electrode. A titrator 33, similar to titrator 12 or of another design that is commercially available is also in communication with bath 4 for withdrawing a sample for titration. Actuable valves 34 and 35 are provided for adding make-up liquid to bath 4 and for draining excess liquid, respectively.

Unlike bath 2, the example of bath 4 involves an exothermic reaction so that bath 4 may be self-heated to a temperature beyond a desirable range. The temperature of bath 4 is monitored by sensor 31. A coiled cooling tube 36 is disposed around the vessel containing bath 4. A liquid coolant flowing through tube 36 cools bath 4. A temperature sensor 37 within or in communication with tube 36 monitors the temperature of the coolant. The coolant temperature information is supplied to computer 20 for use in altering the rate of flow of coolant and, thereby, the rate and extent of cooling of bath 4.

The coolant may be a continuously circulating bath that is drawn from and accumulated in a sump. From time to time it may be desirable to add a biocidal agent to the coolant. Computer 20 may include a clock that periodically opens a valve (not shown) for the introduction a fixed volume increment of a biocide into the rinsing fluid sump.

Bath 5 is a rinsing bath, much like bath 3. It contains instrumentation and valving similar to that described with respect to bath 3 and therefore that description is not repeated.

Bath 6 may be an overcoating, sealing or second coating procedure. In the illustration, this treatment is less critical than that occurring in bath 4. Accordingly, bath 6 is monitored solely by a titrator 41 that is tied to computer 20. In addition, valves 42 and 43 provide for the addition of liquid to, and the drainage of liquid from, bath 6, respectively.

In the final bath treatment, bath 7 provides another rinse. Bath 7 contains the same instrumentation as baths 3 and 5 so that its description is not repeated.

After treatment in bath 7, substrate 1 may retain some residual liquid. The substrate is dried in a stream of warmed air flowing from nozzle 8. A temperature sensor 44 is disposed within the stream of air exiting from nozzle 8 and monitors the flowing air temperature. Sensor 44 provides air temperature information to computer 20 that can actuate a heater for the flowing air, as needed, to maintain a minimum drying air temperature.

The software driven operation of the process control apparatus of the type schematically illustrated in FIGS. 1A-1H may take a number of forms. A flow diagram illustrating a preferred form of operation of process control apparatus according to the invention is shown in FIG. 2. The flow diagram schematically represents the operation of a system according to the invention. Preferably, the system runs continuously except for catastrophic failures, including power outages. A clock with a battery or other back-up power source maintains a record of the beginning of operation and any interruptions, including their beginning and ending times as well as their durations.

At step 50, the apparatus is energized either for the first time or upon restoration of electrical power after a failure. Upon energization, the operating software for the system is loaded at step 51. The operating software may be stored on magnetic media, such as on a disk, or, preferably is stored in a erasable, programmable, readable only memory (EPROM).

Once power is applied, the sensors are energized and stabilized. Preferably, a generalized sensor energization instruction is produced that is provided to a table including an inventory of the sensors employed. The inventory includes for each sensor an address in the computer program where energization instructions for each type of sensor are stored. Those instructions are then executed. The instructions may, for example, close a switch so that the appropriate potential is applied across the electrodes of conductivity sensor 10. A constant current for intializing a thermistor acting as temperature sensor 11 may be supplied so that an equilibrium temperature of the thermistor can be established. Other sensors are initialized and energized as appropriate. In the same step, sensor responsive controls may be actuated. For example, electrical current may be supplied to heater 13 to establish a desired operating temperature point. A coolant pump (not shown) may be actuated to pump a cooling liquid through pipes 36.

At step 52 the beginning and ending times of any power failure are recorded in memory or on a hard copy. In step 53, following conventional procedures, the software executes diagnostic tests to ensure that the computer controlling the system is functioning properly. If at step 53 an error is detected, an error message is displayed on a CRT terminal or another output device in step 54. An alarm signal is also generated to alert, at step 55, an on-site or off-site system manager. Preferably, step 55 includes actuation of a modem or automatic dialing device that can telephone an on-site supervisory and/or an off-site service organization. Either through a modem with a voice synthesizer driven by the system software or an automatic dialer including a catalog of selectable pre-recorded messages, the recipient of the alert is told of the existence of and the nature of the problem. Depending upon the nature of the error indicated, the servicer may be able to supply a correction over a modem so that system operation can proceed. If the error cannot be corrected, the system stops at step 56 until further action is taken by the system servicer to correct the malfunction.

Assuming no error has been found or an error that has been found is corrected, the system proceeds to step 60 where an inquiry is made concerning calibration of the sensors. Some of the sensors may be calibrated based on the time in service since their most recent calibration. A replacement sensor may be calibrated at the first opportunity after its installation. Other sensors may be calibrated after a significant change in the parameter they sense, followed by a significant bath characteristic correction. If in step 60 calibration is determined to be needed, the necessary calibrations are attempted at step 61. The calibration steps are different for different sensors. For example, titrators 12, 33 and 41 may be operated to establish a reference value as described in my copending application. A thermistor acting as temperature sensor 11 can be tested by determining whether a reasonable electrical current will flow to eliminate any possibility of an open or short circuited thermistor. Or a bath parameter established by other sensors may be compared to a measurement made by a sensor being calibrated.

The completed calibrations are tested at step 62 to determine their success. If the attempted calibrations are not successful, an error message is produced at step 63. That message may be supplied to a CRT terminal and/or a hard copy output unit, such as a printer, and may be recorded in a system memory. An unsuccessful calibration causes the sensor involved to be inhibited, i.e., to be taken out of service at step 64. An operator may respond to an inhibition step by taking appropriate action, e.g., replenishing an exhausted titrant supply in a titrator or replacing the sensor. In that case, the replacement sensor will preferably be calibrated during the next call of step 60. Sensor inhibition in step 64 avoids, for the inhibited sensor, the interrogation steps 70–73 described below.

If any calibrations called for are successfully completed, then the calibration data is stored in a random access memory at step 65. That stored calibration data can be used as a reference for the next calibration of the sensor involved and as a reference for interpreting ongoing measurements made by the sensor. That is, the system calls upon the remembered calibration data in interpreting the raw sensor data obtained in any measurement steps.

After any calibrations, at step 70 an inquiry concerning interrogation of sensors is made. Generally, the sensors are interrogated sequentially, however, it may be desirable to avoid or omit interrogating each sensor in each interrogation sequence. Some sensor signals might be slow to change or other sensors may require a relatively long interrogation time, e.g., titrator 12. These sensors might be omitted from every other interrogation sequence or be interrogated only during, for example, every third or fourth interrogation sequence. Step 70 ensures that the desired sensor interrogation sequence is executed.

The interrogation sequence controlled in step 70 is applied in step 71. Most or all of the sensors are expected to provide raw information that is within some reasonable range. (These ranges of reasonableness are different from the upper and lower limits of bath characteristics that represent bath operating limits.) In step 72, the raw sensor data is compared to established limits of reasonableness. Failure to meet those limits results in a transfer to steps 63 and 64 as already described. A failure indicates a malfunctioning sensor that requires replacement, cleaning or some other attention. If the measured values meet the reasonableness limits, the measured values are stored at step 73 for further manipulation and evaluation in subsequent steps.

After sensor interrogation, at decision step 80, a test is applied to determine whether newly acquired sensor measurements are available. If so, those new measurements are employed in step 81 to calculate the bath characteristics that are being monitored. As noted above, the sensed parameters may be combined according to formulas that are part of the system software to produce a bath characteristic of interest. Some of the sensed parameters may also be directly used, without combination with other parameters, to provide a bath characteristic of interest.

Once the bath characteristics of interest have been determined or calculated, they are tested against both the upper and lower limits of acceptable operating values that have been previously supplied. These comparisons take place in step 82. If a characteristic is beyond its established limits, the necessary response is calculated in step 83. That response is calculated, based on an established operating target value for the characteristic, to restore the characteristic to the target value, within the limits. For example, if the acidity of a bath has declined beyond its lower limit, in step 83 the quantity of a make-up solution of known concentration that must be added to restore it to the target point is calculated. The make-up solution might be added by opening a valve, such as valve 14 or 34. The flow rate through the valve is known, so that the quantity of make-up solution to be added can be calculated in terms of the time period that the valve is to be opened.

In step 84, the corrective responses planned and calculated in step 83 are executed. Computer 20, for example, sends electrical signals to open the appropriate valves for the necessary times in an attempt to move the bath characteristic back to its target point. Whether those corrective responses were successfully taken or not is tested in step 85.

In step 85, a determination of the direction of change of the characteristic being corrected is made. If the direction of change is incorrect, i.e., if acidity decreases when an acid make-up reagent is added, the correction is deemed unsuccessful and step 86 is reached. If the direction of change of the characteristic being corrected is desired, then the measured characteristic is compared to its operating range. If a value within the preselected operating range has not been achieved, a second corrective action is attempted. Each successive correction attempt for a particular characteristic without reaching its operating range is counted. If the number of "converging" corrective iterations reaches a preselected count without reaching the operating range, the corrective action for that characteristic is considered unsuccessful.

While the iterative corrective steps are described in the preceding paragraph in connection with steps 83–85, the iteration may actually involve successive interrogation cycles as illustrated in steps 70–73. That is, when a corrective response is called for in step 82, flags are set for the sensor or sensors involved. When data from the sensors involved are next gathered and characteristics are determined in step 81, set flags cause the further tests concerning the correction to be initiated, e.g., has the characteristic changed in the desired direction, has the operating range been reached, and has the number of correction attempts exceeded the maximum number allowed? These tests are part of step 85.

If the corrective response is not successful, then an error message is generated at step 86. As before, the message may appear on a CRT terminal, on a printer or elsewhere to alert the system operator. A failure to achieve the desired correction halts, at step 87, further attempts to make that same correction until the operator takes any necessary action and indicates correction of any malfunction. For example, a defective solenoid valve may have to be replaced, cleaned or cleared, or a float valve may have to be adjusted so that corrective responses can proceed as intended.

If the sensed parameters are within the desired range, if a correction has been successfully made or if a further corrective response has been inhibited, then the program proceeds. At optional steps 90 and 91, charts of the changes in bath characteristics are displayed or plotted as new data becomes available. These graphical plots may appear on a CRT terminal or on a printer or on an x-y plotter. They may be supplemented by tabular data produced by a printer. It is desirable to reproduce multiple graphical plots. For example, a separate plot may be produced for each bath and may display several characteristics for that bath. Another plot may disclose characteristics for the overall process, for example, bath temperatures for each bath. The plots may show historical and new data so that trends may be readily discerned. A CRT terminal display is preferred with the use of multiple plots because any of the graphs can be chosen at random by the operator as discussed below in connection with step 103.

As noted above, the information displayed in the graphs is not necessarily that which is directly measured, but may be calculated from measured data. Thus, a simplified view of operations can be presented to a relatively unsophisticated operator. The operator has no knowledge of, and need not have knowledge of, the actual measurements or of the calculations used to evaluate them and to make any necessary corrective responses.

Decision step 100 represents a test to determine whether a flag indicating an interrupt procedure has been set. If the flag has been set, it indicates that the system operator is attempting to supply information to the system. Typically, computer 20 includes a CRT display terminal, a keyboard and/or a mouse or other input device for receiving instructions and data. If the flag is set at step 100, then the type of input request sought is determined at step 101. The input request may seek to indicate that a malfunctioning sensor or valve has been replaced or cleared. The input request may seek to change the chart or other screen being displayed on the computer terminal. The input request might also seek to change bath characteristic target points or limits or even to alter the system software. The last two requests are particularly sensitive.

Unauthorized changes in the operating targets or system software could adversely affect the performance of the chemical process and result in unacceptable products. Because the system is intended to be operated by a relatively unsophisticated person, it is desirable to prevent that operator from making important operating changes without higher level authority. To ensure that input requests are authorized, the system includes an authorization test at step 102.

Authorization step 102 may include either software or hardware or both. In an exclusively hardware embodiment, step 102 may include an electrical switch actuated with a mechanical lock and key having several positions. An operator's key may only permit one of several active lock/switch positions to be attained. A supervisor's key may allow the switch to be positioned in a second active location closing other circuitry so that modification of the range limits and operating targets may be made. A third active key position, available only to a system supplier or servicing organization allows modification of the system software. In an entirely software embodiment of the authorization step, different passwords may be assigned and checked by the computer for the access level associated with a particular password.

In a preferred, combination software and hardware embodiment, electronic "keys" may be provided to operating, supervisory and servicing level personnel. These kinds of keys can provide, in an established hierarchy, several degrees of access to the operating system. Such programmable keys are commercially available from Dallas Semiconductor of Dallas, Tex. These keys incorporate a programmable memory that may be programmed by the system supplier with several levels of encryption to provide a hierarchy of access authorizations. These physical keys include a number of electrical contacts and are plugged into a receptacle provided as part of the system. In use, the key must recognize the system and vice versa before authorization for a particular activity is granted. For example, if the computer recognizes at step 102 that the heirarchy of the key installed allows the input request made, then step 102 is passed. Absent the minimum access authority needed for the input request made, access to the operating system requested is denied and a return to the flow diagram between steps 90 and 102 results. Because the preferred keys may be programmed in a variety of ways, they can be advantageously employed to avoid intentional damage to the system. In a single, relatively simple reprogramming step, the hierarchy and/or access authorization can be modified. Lost, stolen or unreturned keys can thus easily be locked out from future use.

If in step 102 the authorization is appropriate for the input request sought, the operator and/or computer can, in steps 103–107, execute the request. If in step 102 the access authorization is denied, looping is continued until the request is changed or appropriate authorization is supplied. Alternatively, to avoid delays in system operation, after a fixed number of authorization failures the program may ignore the request and go on to step 110. In addition, a failure to provide appropriate access authority can trigger an alert to the system servicer or to supervisory personnel as a warning against possible intentional alteration of the system or of inadequately trained personnel. The alert may be automatically transmitted to an on-site or off-site location by telephone.

Assuming authorization 102 has been passed, then requested input steps are executed in steps 103-107. Steps 103-107 require different degrees of access authority and entry to them is selectively exercised in step 102. For example, step 103 in which the graphical chart displayed on a CRT terminal may be changed is available to the lowest level of authority, a system operator. Likewise, the entry of an inhibition clearing instruction at step 104 is available to an operator. In step 104, any sensor or corrective response inhibitions set in steps 64 and 87 are reset. An operator enters an inhibit reset after discovering the cause of an error, e.g., a defective sensor or an exhausted reagent, and correcting it. Actuation of an inhibit reset preferably automatically sets flags so that formerly inhibited sensors and sensors involved in a failed corrective response are calibrated at the next execution of steps 60-65.

Supervisory level authorization is needed to enter steps 105 and 106 where sensor parameters and operating target points and limits may be altered. Finally, service level authority is required for access to step 107 where the system software may be altered. After the execution of authorized input requests, the software continues to loop until all input requests are disposed of.

The system preferably includes an optional off-line capability, illustrated in steps 110-113, for altering the software. When that capability is present, after disposition of any operator input requests, the system checks a flag at step 110 to determine whether any incoming message is being received at the modem that is part of the apparatus. If a telephone message is present, the telephone is answered and cross authorization tests are applied at step 111 to both the caller and the receiving apparatus. If either application of the authorization test is failed, the telephone is disconnected. If the authorization tests are passed, then the highest level of access is granted the caller. The system can send a status report, at 112, to the caller. At step 113, the caller may give commands to the system. After completion of the communication, the telephone link is disconnected. Step 113 allows an off-site system supplier to take corrective action from a remote site in response to alarms issued at steps 55 63, 86 or 130. This rapid response may advantageously shorten any apparatus down time. However, if a process control system owner chooses not to receive service from outside, optional steps 110-133 can be eliminated.

If steps 110-113 are present, it is desirable to include optional steps 120-124. In step 120, rather than waiting for an incoming inquiry, the system checks a flag to determine if a historical data bank is full or nearly full, or sufficient time has elapsed since the last incoming telephone call to warrant an outgoing call. If either of these events occurs, then a telephone call is placed through the modem to the system supplier at step 121. When a connection has been made, an authorization inquiry is made to determine if the receiver is entitled to the most intrusive access level. If that test, at step 122, is failed, the telephone line is disconnected. If the authorization test is passed, then a status report is dispatched to the remote receiver. The memory containing the status report is dumped and again starts collecting measured data, calculated characteristics, unusual events and their timing, etc. for the next status report. The receiver can become a sender in step 124 and send information, including software alterations, back to the system. Steps 112 and 113 are analogous to steps 123 and 124.

At various points in the system operation, errors may be encountered. Some of those errors may be correctable, some may be serious, but correctable, and others may be catastrophic. Errors may be encountered and noted at steps 54, 63 and 86. As indicated at those steps, a transfer to step 130 may optionally occur directly. Alternatively, after steps 120-124 are completed, a list of errors detected in steps 54, 63 and 86 may reach step 130. At step 130 a discrimination is made between errors that are serious and those that are not. Serious errors indicate a potential future malfunction that could halt system operation or a malfunction that does halt the process being controlled with the apparatus. A specific example of an error that would trigger step 130 is a drift of a bath parameter or characteristic that fails to respond to successive corrective actions or responds in the wrong direction to a corrective action.

In those instances when a sensor error is encountered, a telephone call is placed at step 131 and a message about the error is delivered to a supervisor and/or a system service. Preferably, the apparatus for delivering these messages includes an automatic dialer for dialing a specific on-site and/or off-site number and delivering a preselected one of a number of prerecorded messages. The automatic dialer may be a computer incorporating a voice synthesizer to deliver the message. Preferably, the equipment includes a reverse message acknowledgment step 133, after the purported message delivery at step 132. If the acknowledgment is not received, the system loops back to the calling step. Message delivery is repeatedly attempted until a acknowledgment is received. Thereafter, or if decision 130 indicates no telephone call is necessary, the system returns to step 60.

Steps 130-133, like steps 110-124 are optional. If those optional steps are absent, the system returns from step 100 to step 60. Otherwise, the system returns to step 60 from step 130. The system continuously repeats the steps just described, from 60 to 100 or 130, and back to 60, until the power fails intentionally or unintentionally.

In FIG. 3, a schematic diagram that is illustrative of hardware that can be used to construct embodiments of the novel apparatus is shown. The central element in FIG. 3 is a microprocessor 150 such as an 5052-AH-BASIC processor manufactured by Intel. Microprocessor 150 supplies output information to and receives input instructions from a computer terminal 151. The terminal preferably includes a CRT for providing output information in both graphical and text form. Terminal 151 may be a so-called intelligent terminal that may process input information before passing it to the system, that can direct its displayed information to printer 152 or that can pass incoming data directly to the printer. Microprocessor 150 also supplies output data to a printer 152 for creating a hard copy record of events occurring within the system. The computer software is stored within one or more conventionally available EPROMs 153, such as Texas Instruments 2764-20 units. Also in communication with microprocessor 150 is a random access memory (RAM) 154 in which are stored the desired operating range limits and operating targets for each parameter or for combinations of parameters indicating bath characteristics. RAM 154 also stores historical information on the performance of the system. Static RAM units TC5564-15 made by Toshiba are appropriate elements from which to construct for RAM 154.

Microprocessor 150 controls the operation of the sensors and control elements such as valves and heaters, through an interface 155. In interface 155, universal instructions for sensor activation and operation are employed with an address table to convert those generalized instructions to specific instructions for specific types and locations of sensors.

Interface unit 155 receives low level digital instructions from microprocessor 155 and converts them into the appropriate electrical signals for operation of sensors and control elements. For example, the appropriate signal could close a circuit providing conventional line voltage to a pump 156 or a reduced line voltage to actuate solenoid valves 157 or heaters 158. Interface 155 may also initiate an independently controlled cycle of a titrator 160, such as the type of titrator described in my co-pending patent application. The receipt of appropriate control signals by interface 155 can also trigger application of measurement potentials to particular sensors such as a conventional pH sensor 161, a conductivity sensor 162 and an electrical temperature sensor 163. As explained above, other sensors can be employed in apparatus according to the invention in addition to those shown in FIG. 3. Moreover, since FIG. 3 is merely schematic, it is understood that embodiments of the novel apparatus are likely to contain multiple pH, conductivity, temperature and other sorts of electrically driven sensors.

Interface 155 may be constructed from conventionally available I/O cards in conjunction with AC or DC power output modules. Typical I/O cards are BCC-40 models available from Micro Mint of Vernon, Conn. employing OAC-5 and ODC-5 power modules made by Potter and Brumfield and others and available from Micro Mint.

A particular advantage of the invention lies in the simplicity of adding, deleting or changing sensors because of the construction of interface 155. As described above, the system activates, calibrates and interrogates sensors by sending out the appropriate signals that do not vary according to sensor type. These "plain vanilla" signals are referred to an address table that identifies the sensor types and locations and directs the software to programs or subroutines that are sensor specific. Preferably, the catalog of subroutines encompasses as many sensor types as possible regardless of the presence or absence of a particular sensor type in a specific system. Addition or deletion of a sensor or substitution of a different type sensor is therefore particularly simple. Such a change is accomodated by altering the address table as to sensor location or number, as necessary. However, the driving software need not be changed. In addition, an I/O card may need to be added, removed or changed. Thus, the system is not limited, as known process control apparatus is, by a fixed number of a specific kind of input and output slots. Rather, the novel system is limited only by the number of "universal" ports it contains for communicating with I/O cards. These ports do not necessarily correspond to electrical connectors commonly referred to as slots for receiving I/O cards. Rather, an I/O card may contain hardware for driving one or more sensors and a physical slot may therefore correspond to more than one port. Thus, the number of ports available is not limited by hardware. Since software, rather than hardware, largely determines the potential sensor configuration of the system, the present system is extremely flexible as to the types of sensors used and their locations.

Interface 155 also includes a telephone 164 that may be used for communications with on-site or off-site personnel as indicated in FIG. 2. For example, telephone 164 can be a modem or automatic dialer programmed with telephone numbers of on-site supervisory and off-site servicing personnel to issue synthesized or recorded voice alerts concerning system malfunctions.

Sensors 160-163 provide electrical signals that are indicative of various bath parameters. The information from those sensors is generally in analog format. That sensor information is applied to a conventional analog-to-digital converter 170, which may be a BCC-30 from Micro Mint. The sensor signals may have to be reduced to a range of magnitudes suitable for input to converter 170 and may require buffering and/or filtering. In convertor 170, the sensor signals are converted from analog form to digital form. Under the control of, and in response to, the interrogation of microprocessor 150, converter 170 supplies the requested sensor information in digital form to the microprocessor. In microprocessor 150 this sensed information is used in the course of executing the system software to determine bath characteristics and to test whether those characteristics fall within the specified operating range limits.

A conventional modem 171 is provided in direct communication with microprocessor 150. Modem 171 is particularly intended for communication with off-site servicing personnel. Those off-site personnel may telephone the apparatus through modem 171 in order to obtain status reports, to change target or limit points or modify the software as the apparatus is changed for different applications. In the event of a malfunction, communication through modem 171 may allow off-site personnel to correct errors and restore service promptly without the necessity of visiting the site of the system. A preferred sequence for those activities has been described in conjunction with FIG. 2.

The invention has been described with respect to certain exemplary preferred embodiments. Various modifications and additions within the spirit of the invention will occur to those with skill in the art. Accordingly, the scope of the invention is limited solely by the following claims.

I claim:

1. An apparatus for chemical bath process control comprising:
   a plurality of sensor means, each of said sensor means for sensing at least one parameter of a bath;
   means for interrogating each of said sensor means to determine its said sensed parameter;
   means for determining at least one characteristic of said bath from said sensed parameters;
   means for comparing said characteristics to established, respective operating limits;
   means for initiating a corrective response when a characteristic falls outside its said operating limits, said means for interrogating, for determining, for comparing and for initiating comprising a computer; and
   communication means for transmitting said sensed parameters and/or bath characteristics to a remote location and for transmitting instructions from said remote location to said computer.

2. The apparatus of claim 1 wherein said sensor means includes means for measuring pH.

3. The apparatus for claim 1 wherein said sensor means includes means for measuring temperature.

4. The apparatus of claim 1 wherein said sensor means includes means for measuring electrical conductivity.

5. The apparatus of claim 1 wherein said sensor means includes a titrator.

6. The apparatus of claim 1 wherein said means for initiating a corrective response includes means for adjusting said characteristic toward its said target value.

7. The apparatus of claim 6 wherein said means for adjusting includes means for addition of a reagent to said bath.

8. The apparatus of claim 1 including means for measuring a said characteristic after initiating a corrective response and for inhibiting additional corrective responses when said characteristic does not approach or fall within said limits a target value after said corrective response.

9. The apparatus of claim 1 including means for measuring a said characteristic after making successive corrective responses and for inhibiting additional corrective responses after a preestablished number of corrective responses have been made without restoring said characteristic to within said limits.

10. The apparatus of claim 1 including means for calibrating at least some of said sensors and for inhibiting operation of sensors that cannot be calibrated.

11. The apparatus of claim 10 including means for measuring a said characteristic after initiating a corrective response and for inhibiting additional corrective responses when said characteristic does not approach or fall within said limits after said corrective response.

12. The apparatus of claim 1 including means for comparing sensed parameters to a range of respective reasonable values for each said parameter and for inhibiting operation of a sensor producing a sensed parameter outside its respective range.

13. The apparatus of claim 1 including means for generating an error signal upon detection of a specified event, and means responsive to said error signal for automatically initiating communication with said remote location.

14. The apparatus of claim 13 wherein said specified event is a computer malfunction.

15. An apparatus for chemical bath process control comprising:
a plurality of sensor means, each of said sensor means for sensing at least one parameter of a bath;
means for interrogating each of said sensor means to determine its said sensed parameter;
means for determining at least one characteristic of said bath from said sensed parameters;
means for comparing said characteristics to established, respective operating limits;
means for initiating a corrective response when a characteristic falls outside its said operating limits, said means for interrogating, for determining, for comparing and for initiating comprising a computer operating in response to computer software, said computer generating a generalized set of control signals having universal usage with different types of sensors employable in said apparatus as at least one of said sensor means; and
means for interfacing said sensor means to said computer, said means for interfacing comprising means for tailoring said generalized set of control signals to at least one of said sensor means for driving the sensor means in response to said control signals of said generalized set.

16. The apparatus of claim 15 wherein said sensor means includes means for measuring pH.

17. The apparatus of claim 15 wherein said sensor means includes means for measuring temperature.

18. The apparatus of claim 15 wherein said sensor means includes means for measuring electrical conductivity.

19. The apparatus of claim 15 wherein said sensor means includes a titrator.

20. The apparatus of claim 15 wherein said means for initiating a corrective response includes means for adjusting said characteristic toward its said target value.

21. The apparatus of claim 20 wherein said means for adjusting includes means for addition of a reagent to said mixture or solution.

22. The apparatus of claim 15 including means for measuring a said characteristic after making successive corrective responses and for inhibiting additional corrective responses after a preestablished number of corrective responses have ben made without restoring said characteristic to within said limits.

23. The apparatus of claim 15 including means for calibrating at least some of said sensors and for inhibiting operation of sensors that cannot be calibrated.

24. The apparatus of claim 15 including means for comparing said sensed parameters to a range of respective reasonable values for each said parameter and for inhibiting operation of a sensor producing a sensed parameter outside its respective range.

25. The apparatus of claim 15 wherein said means for interfacing includes a card for driving at least one of the sensor means and means for removably installing said card with respect to said computer.

* * * * *

UNITED STATES PATENT AND TRADEMARK OFFICE
CERTIFICATE OF CORRECTION

PATENT NO. : 4,886,590

DATED : December 12, 1989

INVENTOR(S) : Douglas L. Tittle

It is certified that error appears in the above-identified patent and that said Letters Patent is hereby corrected as shown below:

Column 3, line 5, change "FIG. 1" to "FIGS. 1A-1H".

Column 3, line 5, change "FIGS. 1A-1H" to FIGS. 1A-1F".

Signed and Sealed this

Twenty-seventh Day of October, 1992

*Attest:*

DOUGLAS B. COMER

*Attesting Officer*   *Acting Commissioner of Patents and Trademarks*